United States Patent
Krampe et al.

(10) Patent No.: US 8,944,779 B2
(45) Date of Patent: Feb. 3, 2015

(54) ROTARY LOBE PUMP WITH ANGULAR GEAR

(75) Inventors: Paul Krampe, Essen (DE); Heinrich Deyen, Lastrup (DE)

(73) Assignee: Hugo Vogelsang Maschinenbau GmbH, Essen (DE)

(*) Notice: Subject to any disclaimer, the term of this patent is extended or adjusted under 35 U.S.C. 154(b) by 787 days.

(21) Appl. No.: 12/826,821

(22) Filed: Jun. 30, 2010

(65) Prior Publication Data

US 2011/0052436 A1 Mar. 3, 2011

(30) Foreign Application Priority Data

Jul. 1, 2009 (DE) .................... 20 2009 009 093 U

(51) Int. Cl.
*F04B 17/06* (2006.01)
*F04C 2/12* (2006.01)
(Continued)

(52) U.S. Cl.
CPC ................ *F04C 2/126* (2013.01); *B60P 3/225* (2013.01); *F04C 11/001* (2013.01);
(Continued)

(58) Field of Classification Search
CPC ... A01C 23/002; F04C 13/001; F04C 13/005; F04C 2/126; F04C 14/06; F04C 15/06; F04C 15/0061; F04C 11/001; F04C 2230/60; F04C 2230/40; F04C 2230/80; B60P 3/225
USPC .......................... 417/231, 233, 234, 315, 442; 137/899.4, 565.11, 565.12; 418/208, 418/191, 201.1, 201.6, 209–210, 5, 7–9, 418/206.1
See application file for complete search history.

(56) References Cited

U.S. PATENT DOCUMENTS 2,445,603 A * 7/1948 Cartwright .................... 417/323
2,618,225 A * 11/1952 Mapes .......................... 418/208
(Continued)

FOREIGN PATENT DOCUMENTS

DE     G9113912     2/1992
DE     20008879     9/2001
(Continued)

OTHER PUBLICATIONS

Search Report dated May 19, 2012 is related European Patent Application No. 10167279.8.

*Primary Examiner* — Charles Freay
*Assistant Examiner* — Joseph Herrmann
(74) *Attorney, Agent, or Firm* — Kilpatrick Townsend & Stockton LLP; Dean W. Russell, Esq.; Kristin M. Crall, Esq.

(57) ABSTRACT

The invention relates to a rotary lobe pump for conveying solids-laden fluids engendered in agriculture, in which the conveyed fluid volume flow adapts itself to different operating modes. For improved self-priming, the rotary lobe pump is designed for vertical mounting of the rotary lobes, wherein an angular gear is provided. The rotary lobes are mounted in a topside or underside cover, wherein the axes of the rotary lobes are vertically oriented. Using one of the covers, the rotary lobes can be vertically removed and maintained without having to dismantle other pump components from the pump housing. The rotary lobes can also be removed together with the angular gear as an integral pump component using one of the covers.

4 Claims, 6 Drawing Sheets

(51) Int. Cl.
    *B60P 3/22*           (2006.01)
    *F04C 11/00*        (2006.01)
    *F04C 13/00*        (2006.01)
    *F04C 15/00*        (2006.01)
    *F04C 15/06*        (2006.01)
    *F04C 14/06*        (2006.01)

(52) U.S. Cl.
    CPC ............ *F04C 13/001* (2013.01); *F04C 13/005* (2013.01); *F04C 15/0061* (2013.01); *F04C 15/06* (2013.01); *F04C 14/06* (2013.01); *F04C 2230/60* (2013.01); *F04C 2230/70* (2013.01); *F04C 2230/80* (2013.01)
    USPC .......... 417/233; 417/234; 417/315; 417/442; 418/191; 418/209; 418/210

(56) References Cited

U.S. PATENT DOCUMENTS

| | | | |
|---|---|---|---|
| 2,697,402 A * | 12/1954 | Lindquist | 418/153 |
| 3,544,010 A * | 12/1970 | Jurdye | 239/168 |
| 3,865,523 A * | 2/1975 | Baehr | 418/201.1 |
| 4,074,639 A * | 2/1978 | Hodgson | 111/123 |
| RE29,627 E * | 5/1978 | Weatherston | 418/9 |
| 4,293,290 A * | 10/1981 | Swanson | 418/94 |
| 4,475,872 A * | 10/1984 | Foughty | 417/315 |
| 4,953,396 A * | 9/1990 | Langsdorf et al. | 73/49.3 |
| 5,181,833 A * | 1/1993 | Villa et al. | 417/234 |

FOREIGN PATENT DOCUMENTS

| | | |
|---|---|---|
| DE | 20213879 | 3/2004 |
| DE | 202004000348 | 5/2005 |
| DE | 102007054544 | 6/2008 |
| DE | 202009010962 | 11/2009 |
| EP | 1839475 | 10/2007 |
| WO | WO 2007026109 | 3/2007 |

* cited by examiner

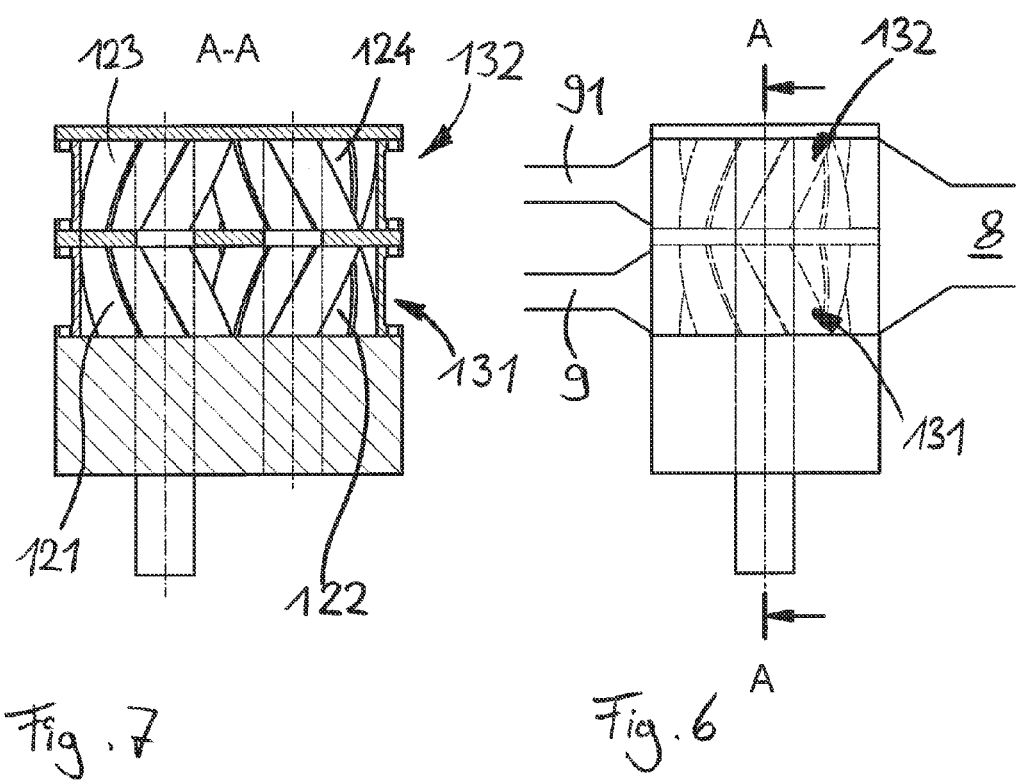

ROTARY LOBE PUMP WITH ANGULAR GEAR

This application claims the benefit of German Patent Application No. 20 2009 009 093.0 filed on Jul. 1, 2009, the contents of which are incorporated herein by reference.

The invention relates to a rotary lobe pump for a tank truck, in particular for solids-laden fluids engendered in agriculture, comprising a drive flange which is connectable to a horizontally extending cardan shaft of a towing vehicle and rotatable in the installed position about a horizontal axis, at least one pair of cooperating rotary lobes, each pair being disposed in a pump chamber which is enclosed by a pump housing, wherein each pair is coupled to the drive flange to transfer a torque, and first and second openings which are formed in the pump housing at each pump chamber and which are in fluid communication with the respective pump chamber.

Such rotary lobe pumps are provided, for example, to convey solids-laden fluids engendered in agriculture. In such a case, the rotary lobe pump performs the function of filling the tank of a tank truck, or of conveying the fluid out of the tank of a tank truck, for example. The rotary lobe pump is driven, for example, via a cardan shaft of a towing vehicle, said shaft being provided in the form of a horizontally extending power take-off shaft. In this case, a preferred mounting position for the rotary lobe pump is between the towing vehicle and the tank, for example in the region of a drawbar of a tank truck.

A power take-off shaft of a towing vehicle generally has an operating speed that depends on the engine power of the towing vehicle. In most cases, this speed can only be adjusted by adjusting the engine power, i.e. the rotational speed of the power take-off shaft is mostly proportional to the engine speed. The feed rate of a pump is proportional over a wide range of speeds to the speed of the pump.

In order to meet the requirements of the various operating modes of rotary lobe pumps, in particular the operating mode that involves filling a tank and the operating mode for discharging fluids from the tank, for example at the place of use, it is beneficial, especially when discharging at the normal high engine power of the towing vehicle, when the speed of the power take-off shaft of a towing vehicle is not transferred in a 1:1 ratio, since this may result in too high a feed rate or pump speed. To lower the speed, a reduction gear is preferably inserted between the power take-off shaft and the drive flange of the rotary lobe pump. However, the disadvantage of this solution is that the engine of the towing vehicle must be operated at an uneconomically high speed if a rotary lobe pump coupled to the power take-off shaft is to be operated with a high volumetric flow rate.

Due to what are frequently strong abrasive effects of the fluid pumped in agriculture, the rotary lobe pump must undergo regular maintenance. The maintenance interval depends not only on the speed at which the rotary lobes of the pump are operated, but also, for example, on the type of fluid, i.e. on its abrasive aggressivity, which is influenced by its solid fraction and by the type of solids in the fluid. When special stresses are imposed, for example when the rotary lobes are particularly stressed by stringy or fibrous solids, or solids with a special consistency, or when special stresses are imposed at frequently high operating speeds, maintenance is needed at weekly or monthly intervals.

Arranging the pump housing of a rotary pump on a tank truck in a horizontal axial arrangement is known from DE 202 13 879 U1. Such a configuration provides good accessibility for maintenance purposes and a simplified design for the drive using a power take-off shaft of a tractor, said power take-off shaft normally being of horizontal extension.

It is known from WO 2007/026109 A1 to unscrew a cover plate, then remove the rotary lobes individually in order to access the two drive axles on which the rotary lobes are mounted in operation, so that maintenance work can be performed on the rotary lobe pump with the rotary lobes dismantled. In that case, the pump housing without cover plate is largely exposed, i.e. the fluid is able to escape completely from the pump housing at the lowest point of the pump housing. This makes it possible for the pump housing to be emptied in a highly controlled manner in the course of maintenance work. Furthermore, an individual component requiring maintenance can be specifically removed and reinstalled in a simple manner.

A rotary lobe pump for use on a tank truck, in which the rotary lobes can be dismantled together with a cover plate or together with the drive axles, by virtue of the pump housing being partitioned, is known from DE 10 2007 054 544 A1. The pump housing is exposed by dismantling the cover plate, with the fluid escaping from the lowest point of the pump housing.

What is problematic about the prior art solutions is that resumption of operations often requires substantial work, even when the pump has been only partially dismantled. The fluid must often be re-fed to the pump by means of an auxiliary unit or manually, before conveying by the pump itself can be restarted.

A first object of the present invention is to provide a rotary lobe pump that can be deployed flexibly and more economically than known solutions in respect of the fluid volume flow rate to be pumped.

One aim of the invention in this regard is to provide a rotary lobe pump that restarts better after maintenance than known rotary lobe pumps.

Another aim of the invention is to provide a rotary lobe pump that can be maintained in a simple manner The above object is achieved by a rotary lobe pump of the kind initially specified, in which each rotary lobe is rotatably mounted in the pump housing about a vertically oriented rotational axis when the rotary lobe pump is in its mounted position, wherein the rotational axes of the rotary lobes extend parallel and spaced apart from each other and an angular gear is provided for transferring the torque from the drive flange onto the rotary lobes.

The rotary lobe pump according to the invention achieves better accessibility for maintenance because it is possible to remove the rotary lobes in the vertical direction.

A rotary lobe pump according to the invention for a tank truck, in particular for solids-laden fluids engendered in agriculture, has a drive flange which is connectable to a horizontally extending cardan shaft of a towing vehicle and rotatable in the mounted position about a horizontal axis. A rotary lobe pump according to the invention also has at least one pair of cooperating rotary lobes, each pair being disposed in a pump chamber which is enclosed by a pump housing, and each pair being coupled in such a way to the drive flange to transfer a torque that the rotary lobes of a pair of rotary lobes turn in opposite directions. The rotary lobes convey the fluid through the pump chamber from a first to a second connector opening, or, when rotating in the reverse direction, from the second to the first connector opening. According to the invention, rotary lobes may have two or more wings, but preferably four wings. The rotary lobes are also coupled in the manner of the invention when there are several pump chambers, although operation of the rotary lobes of a first pump chamber does not necessarily affect the operation of the rotary lobes of a different pump chamber.

The invention is further characterised in that, to facilitate maintenance, the rotary lobes may be rotatably mounted in the pump housing about vertically oriented axes when the rotary lobe pump is in its mounted position, although it is also possible and in certain cases beneficial to mount them about horizontally oriented axes. "Mounted position" should be understood here to mean a mounted position of the rotary lobe pump in the immediate vicinity of a tank, for example, with the pump being disposed fluidically between a pipeline connected to the tank and a pipeline leading away from the tank. The tank may be disposed on a tank truck, with the mounted position preferably being in the region of the drawbar of the tank truck. Vertically oriented axes of the rotary lobes thus intersect a horizontal plane substantially orthogonally. If the rotary lobe pump is installed in the region of the drawbar of a tank truck, such a horizontal plane is spanned, for example, from the struts of the drawbar itself, or from the frame of the tank truck on which the tank rests.

In order to transfer the torque from the drive flange onto the rotary lobes, an angular gear may be provided, where an angular gear is understood to be a gear by means of which the direction of the force to be transferred or the torque to be transferred is deflected, i.e. the direction in which the input shaft extends differs from the direction in which the output shaft extends, differing in particular by 90°. A bevel gear, for example, which typically deflects the force to be transferred or the torque to be transferred by 90°, may be considered an angular gear.

The invention is based on the realisation that the pump housing should not be drained until essentially dry for maintenance or when replacing the rotary lobes, but that the pump housing must continue to be disposed in such a way that the rotary lobes remain accessible for maintenance purposes in the mounted position. The measures to be taken to ensure sufficient accessibility are dependent on whether the drive axles connected to a drive remain in position, so that the drive itself does not need to be dismantled, or whether the drive must be decoupled and positioned so that the rotary lobes can be dismantled together with the drive axles. Until now, the structure of a rotary lobe pump dictated whether or to what extent the pump housing must remain accessible from both the front and the back, whereby the space in front of and/or behind the pump housing had to be sufficient to dismantle the rotary lobes and/or the drive shafts, which corresponded to at least one pump length in space. In the event that a gear had to be provided additionally between the drive and the drive axles of the rotary lobe pump, this gear was usually dismantled as well in order to perform maintenance work on the rotary lobes.

With the rotary lobe pump according to the invention, the pump housing can be made accessible when the rotational axes of the rotary lobes are vertically oriented, without all or significant parts of the fluid escaping from the pump housing. The vertical orientation of the axes of the rotary lobes results in an improved self-priming function, for example during a startup operation of the rotary lobe pump after maintenance. In combination with the angular gear, the rotary lobe pump with vertically oriented axes of the rotary lobes can be coupled to a horizontally extending cardan shaft of a towing vehicle.

It is also possible for the connections of the rotary lobe pump to be arranged in such a way, due to the vertical orientation of the rotary lobe pump, that any remaining fluid always stays in the connector regions, even when the pump is stopped for a longer period or after partial dismantling, with the result that self-sealing by the fluid and hence the self-priming capability is improved.

Due to the vertical orientation of the axes of the rotary lobes, it remains possible to perform maintenance in a simple manner. It has been found, surprisingly, that construction space can be saved with the inventive solution relative to the prior art, since it is not necessary to provide the free space required at the side of, in front of or behind the pump housing in order to remove the rotary lobes. Instead, the rotary lobes of the invention can be dismantled and installed in the vertical direction. The rotary lobes may also be dismantled or installed in combination with the angular gear, as an interconnected pump element. This means that no additional space is required at the sides, so the rotary lobe pump can be disposed independently of its structure, for example immediately adjacent to the tank of a tank truck. Sufficient space is usually available above the rotary lobe pump, so the mounted position can also be chosen under boundary conditions that are less strict than hitherto due to the vertical orientation of the axes of the rotary lobes.

Particularly when there are several pairs of cooperating rotary lobes, i.e. when there are several pump chambers, a vertical orientation of the axes of the rotary lobes is of great benefit. This is because, when there are several pump chambers, a horizontal orientation would require accessibility, depending on the structural shape, not only in front of but also behind the rotary lobe pump, i.e. one would be even more restricted in the choice of mounting position than in the case of a single pump chamber. The improved self-priming function can also substantially facilitate startup of the pump after maintenance work, particularly when there are several pump chambers.

It has also been found, surprisingly, that a compact construction can be achieved with the invention, due to the frequent need for an angular gear in any case, also when adapting the pump to what is often a higher power level at the take-off shaft of state-of-the-art towing vehicles. The increased power level is often provided by increasing the rotational speed, but this may lead to increased wear and tear, impermissible heating and basic design problems in the case of rotary lobe pumps. The solution according to the invention makes it possible to reduce the speed in the angular gear itself and hence to provide a rotary lobe pump with higher power using higher torques.

The self-priming function is also improved when a fluid storage volume is disposed adjacent to the openings of the pump chambers at least on the intake side or on the outlet side, but preferably on both the intake and the outlet sides. The fluid storage volume(s) provided on the intake side and/or the outlet side may be coupled to the pump housing via connector openings. Additional fluid can be retained in these fluid storage volumes during maintenance. The fluid from the fluid storage volume(s) may flood at least significant parts of the pump chamber after maintenance, which is why the pump chamber is already flooded to a significant extent when restarting, even when fluid has escaped from the pump chamber after maintenance. The fluid on the outlet side has the advantage that it cannot be conveyed directly out of the pump region by the conveying movement of the pump, but can also produce a sealing effect in the pump chamber in support of the startup operation, by continuing to flow even after the first revolutions. The fluid storage volume provided on the intake side ensures that the pump has sufficient fluid for the conveying operation during startup, such that underpressure can be produced on the intake side by the flow of fluid from the intake side into the pump. Compared to known pump, the self-priming function is significantly improved by these fluid storage volumes, on the intake and/or outlet sides, when the pump chamber is completely or partially drained.

A component through which fluid flows and which is disposed between the pump housing and the incoming or outgoing pipeline can be considered a fluid storage volume in this context. A fluid storage volume provides additional volume. A fluid storage volume may be inserted between a connector opening of the pump housing and the flange of a pipeline, for example. Fluid storage volumes can store fluids in different ways, and can also support retention of the fluid hydromechanically, electrically or pneumatically. The fluid storage volumes according to the invention may have any geometry, in particular a geometry that is suitable for a respective application or a respective fluid. The fluid storage volumes are, for example, box-like in shape, with opposite substantially parallel side surfaces, i.e. substantially cuboidal. The self-priming capability and/or the assurance of being able to flood the pump chamber completely with fluid after maintenance, increases in proportion to the volume of the fluid storage volumes.

The fluid storage volumes also have an inflow and an outflow region, to each of which a pipeline is coupled through which the fluid is conveyed to the pump chamber or out of the pump chamber, respectively. The inflow and outflow region is preferably disposed on a side surface of a fluid storage volume, said surface lying opposite the lower side surface in the direction of gravity, in other words on an upper side surface or on the uppermost side in the direction of gravity of a respective fluid storage volume. By this means, any draining of fluid through the pipeline or pipelines is made more difficult and essentially prevented, with the result that fluid remains in the fluid storage volumes.

The pump housing preferably has a topside and an underside flange, said flanges having identical dimensions not only in respect of their geometry but also in respect of their position, type and size of sealing means and fixing means, such as grommets or bores for screws. Identical dimensions guarantee that the sealing means and the fixing means of the cover and flanges are compatible with each other. The flanges on the pump housing are used to enable a topside and/or an underside cover to be coupled to the pump housing, and it is also possible to couple to underside cover to the topside flange and vice versa. The possibility of mounting the cover on both the topside and the underside of the pump housing is ensured by the identical flange dimensions. The flanges also perform functions such as sealing the pump housing or transferring bearing forces acting on the cover to the pump housing.

The rotary lobes are preferably mounted in both covers, i.e., the axes of the rotary lobes intersect the topside and the underside cover. The angular gear is attached to one of the covers, and the cover to which the angular gear is attached may be referred to as the drive-side cover. As already mentioned, a drive-side cover is designed to be coupled to the upper or the lower flange. Each rotary lobe is coupled to the angular gear, for example via a shaft that projects through the drive-side cover. The torque applied, for example by the cardan shaft of a towing vehicle, is transferred in this case via the angular gear to the interface formed by the drive-side cover, and via the shaft projecting through the drive-side cover to the rotary lobes.

Due to the axes of the rotary lobes being vertically oriented, the rotary lobes can be vertically dismantled, i.e. can be removed vertically from the pump chamber. The rotary lobes can be removed preferably vertically upward, where vertically upwards can essentially be understood as a direction contrary to the direction of gravity. The rotary lobes can also be removed vertically upwards even when the angular gear and the drive-side cover are coupled to the topside flange. By this means, the rotary lobes can always be removed in the upwards direction for maintenance, regardless of whether the angular gear is attached to the topside cover or the underside cover. This flexibility in respect of maintenance is ensured, inter alia, by the rotary lobes being mounted in the covers. When maintenance is performed on the pump housing, the fluid storage volumes and the pipelines leading to the pump housing and away from the pump housing can remain in their mounted positions.

The power that can be inputted by a cardan shaft of a towing vehicle, for example, is usually far greater than the power which can be taken up by a rotary lobe pump, and the speed of a cardan shaft can also exceed significantly the speed suitable for rotary lobe pumps. It is desirable that a rotary lobe pump be operated at the speed which is optimal for the rotary lobe pump, also with the aim of long maintenance intervals. For this reason, the angular gear is preferably designed as a reduction gear, in other words as a gear that can reduce the speed from that of a cardan shaft.

When filling the tank, what sometimes happens is that the cardan shaft only needs to be driven at half speed. It is also advantageous, therefore, when the reduction gear is designed as a switchable gear, so that the power inputted from a cardan shaft, for example, can also be transferred without reduction.

A reduction gear within the meaning of the present invention is to be understood as a gear that deviates from an operation mode for transferring a rotational speed at a ratio of 1:1 and which can be operated in an operation mode for reducing the output to input speed ratio, wherein such a gear can also be switched, for example. Switchable within the meaning of the invention can additionally or alternatively mean reversing the direction of rotation of the rotary lobes in the rotary lobe pump, in order to deploy a rotary lobe pump not only to fill but also to empty a tank, without having to switch valves or without having to design pipelines as redundant. The type of switching may be manual or automatic, where automatic switching may mean electrical or hydraulic or some other type of switching. Power may also be transferred at an increased rotational speed.

With a switchable reduction gear, the rotary lobe pump may be operated at a reduced speed compared to the engine speed of the towing vehicle, which is necessary in particular when the tractor engine is running at a high speed, since the rotary lobe pump cannot generally be designed for such high rotational speeds.

The rotary lobe pump of the kind initially described or as described above can also and preferably have a first and a second pump chamber, wherein a matching first and second pair of rotary lobes is arranged in each pump chamber, and the pairs are mechanically coupled to each other. The first and the second pump chamber are preferably disposed adjacent to each other.

In this configuration, each pump chamber has two cooperating rotary lobes that are disposed in a common pump housing enclosure, or in a common pump housing for each pump chamber. By providing two pump chambers, the rotary lobe pump can be deployed in a plurality of operating modes, e.g. for discharge when filling the tank in parallel operation of both pump chambers (as when intaking from a slurry store or some other receptacle), or for discharging the fluid at the place of use, by pumping it through each pump chamber separately or by pumping it through both pump chambers in series. In the first of the aforementioned operating modes, it is thus possible to reduce the pump speed required for a high volumetric flow rate and in the second operating mode to keep the conveyed volumetric flow rate low even with a high pump speed. In order to achieve better mixing of the fluid in the tank, particularly in the case of a solids-laden fluid, one chamber may be switched in one operating mode such that it circulates fluid through the tank.

The required fluid volume flow can also be conveyed according to the invention at engine power outputs that are more favourable for a towing vehicle, in particular in the operating mode for filling a tank at a significantly lower engine power compared to the maximum possible engine power of the towing vehicle. This is also possible according to the invention, with a gear being provided between the drive flange and the rotary lobes.

During discharge of fluid, it is also possible according to the invention for fluid to be recirculated back into a tank from which the fluid to be discharged is removed. In this way, it is possible to mix or stir the tank contents, similar to agitation during discharge, which ensures a homogeneous composition of the discharged fluid.

In addition to good mixing of the fluid in the tank, a second pump chamber thus provides the advantage that the ratio of the pump speed to the fluid volume flow rate can be adapted to the different purposes for which the rotary lobe pump is deployed. This advantage exists independently of whether a device for reducing the speed of a power take-off shaft is provided, for example in the form of an angular gear designed as a reduction gear.

In the case of some applications, it is advantageous when the second pump chamber has a smaller volume than that of the first pump chamber. In this way, a larger fluid volume flow rate is conveyed via the first pump chamber at the same pump speed than via the second pump chamber. In order to fill the tank, a higher volumetric flow rate can thus be conveyed at a low pump speed via the first and the second pump chamber in parallel, with less cavitation occurring thanks to the lower speed of the rotary lobe pump. Furthermore, when the speed of the towing vehicle engine is lower, it is possible to operate the pump within an economical range, and to reduce the noise produced by the engine and/or by the rotary lobe pump itself, and/or to increase the service life of the rotary lobe pump, for example the service life of the rotary lobes. When discharging the fluid onto the field, the engine power of a towing vehicle may be increased to the full engine power without the discharged volume flow rate becoming too high, by conveying the fluid to be discharged only via one of the two pump chambers or through both pump chambers in series.

This configuration makes it possible, in particular, to dispense with a switchable reduction gear, without losing flexibility in respect of the fluid volume flow rate based on the rotational speed, for example of a power take-off shaft of a towing vehicle.

Furthermore, the conveyed fluid volume flow rate can be branched through the rotary lobe pump, i.e. it is possible to use a certain proportion of the fluid volume flow rate differently than a remaining proportion of the fluid volume flow rate. This ensures flexibility with regard to the fluid volume flow rate to be conveyed. It has been found that towing vehicles used today provide a sufficiently high torque via a power take-off shaft to be able to supply a rotary lobe pump with the required power level even at a lower speed of the power take-off shaft.

The second pump chamber may be smaller than the first pump chamber in order to have a smaller feed rate than the first pump chamber. In this case, a larger fluid volume flow rate is conveyed via the first pump chamber than via the second pump chamber.

It is also preferred when the first and the second pump chambers each have a first opening which are in fluid communication with each other and which are designed to be connected to a first pipeline, when the first pump chamber has a second opening designed to be connected to a second pipeline, and the second pump chamber has a second opening designed to be connected to a third pipeline. This configuration makes it possible for the two pump chambers to have a common source of fluid and for the fluid to be divided into and conveyed as two volumetric flows.

More specifically, it is preferred when the second pump chamber is so designed that part of the fluid volume flow to be conveyed by the rotary lobe pump is conveyed from the first pump chamber via the second pump chamber and via the third pipeline.

It is also preferred when the rotational axis of one rotary lobe of the pair of rotary lobes of the first pump chamber is coaxial with the rotational axis of a rotary lobe of the pair of rotary lobes of the second pump chamber and that preferably the rotational axis of the other rotary lobe of the pair of rotary lobes of the first pump chamber is coaxial with the rotational axis of the other rotary lobe of the pair of rotary lobes of the second pump chamber. This configuration allows the rotary lobes to be arranged and to operate in a mechanically robust as well as in a simple and maintenance-friendly manner. As a result, it is possible, in particular, for two pairs of rotary lobes to be operated on a total of two axes.

Another aspect of the invention relates to a tank truck with a rotary lobe pump constructed in the manner described in the foregoing, which preferably has a drawbar in the region of which the rotary lobe pump is disposed and which is in fluid communication with the tank of the tank truck in order to fill the tank via an intake line and for dispensing fluid from the tank via a dispensing line.

When preferably using a rotary lobe pump provided with two pump chambers, one outlet opening of the pump chamber may be put in fluid communication with the tank by switching at least one valve to a first valve position, and in a second valve position the outlet opening of the first pump chamber may be in fluid communication with a pipeline for discharging the fluid, and it is further preferably when an outlet opening of the second pump chamber is in fluid communication with the tank. This configuration permits operation with a high or a low volumetric flow rate at a constant rotational speed, by having the fluid flow through the pump chambers in parallel or individually.

It is also preferred, in particular, when switchable valves or nonreturn valves are disposed in the fluid lines required for the intended use of the rotary lobe pump in such a way that in a first valve position a suction pipe is in fluid communication with the inlet opening of the first and second pump chambers and the outlet openings of the first and second pump chambers are in fluid communication with the tank in order to convey fluid from the intake line into the tank when the rotary lobes of the rotary lobe pump rotate in a first direction of rotation, and that in a second valve position the tank is in fluid connection via the first pump chamber with a pipeline for dispensing the fluid and the tank is in a fluid cycle with the second pump chamber for dispensing the fluid from the tank and simultaneously for circulating the fluid in the tank when the rotary lobes of the rotary lobe pump rotate in a direction of rotation that deviates from the first direction of rotation. By means of such a valve mechanism, the rotary lobe pump can be operated in two specific operating modes, one for conveying a high volumetric flow at a low pump speed into the tank and another for conveying a low volumetric flow out of the tank at the same or even at a higher pump speed.

By this means, the pump can be adapted to typical uses and hence for economical operation of the tractor engine. The valve switch may be designed in such a way that reversing the direction of rotation of the rotary lobe pump is necessary or not necessary in order to set the two operating modes.

With reference to the embodiments shown in the Figures, the invention shall now be described, and in particular the maintenance of the rotary lobes, which can be carried in such a way that the rotary lobe pump can restart well after maintenance has been carried out, thanks to improved self-priming.

FIG. 6 shows a front elevational view of the two-chamber rotary lobe pump of FIG. 5.

FIG. 7 shows a cross-sectional view along line A-A in FIG. 6.

Figure 1:
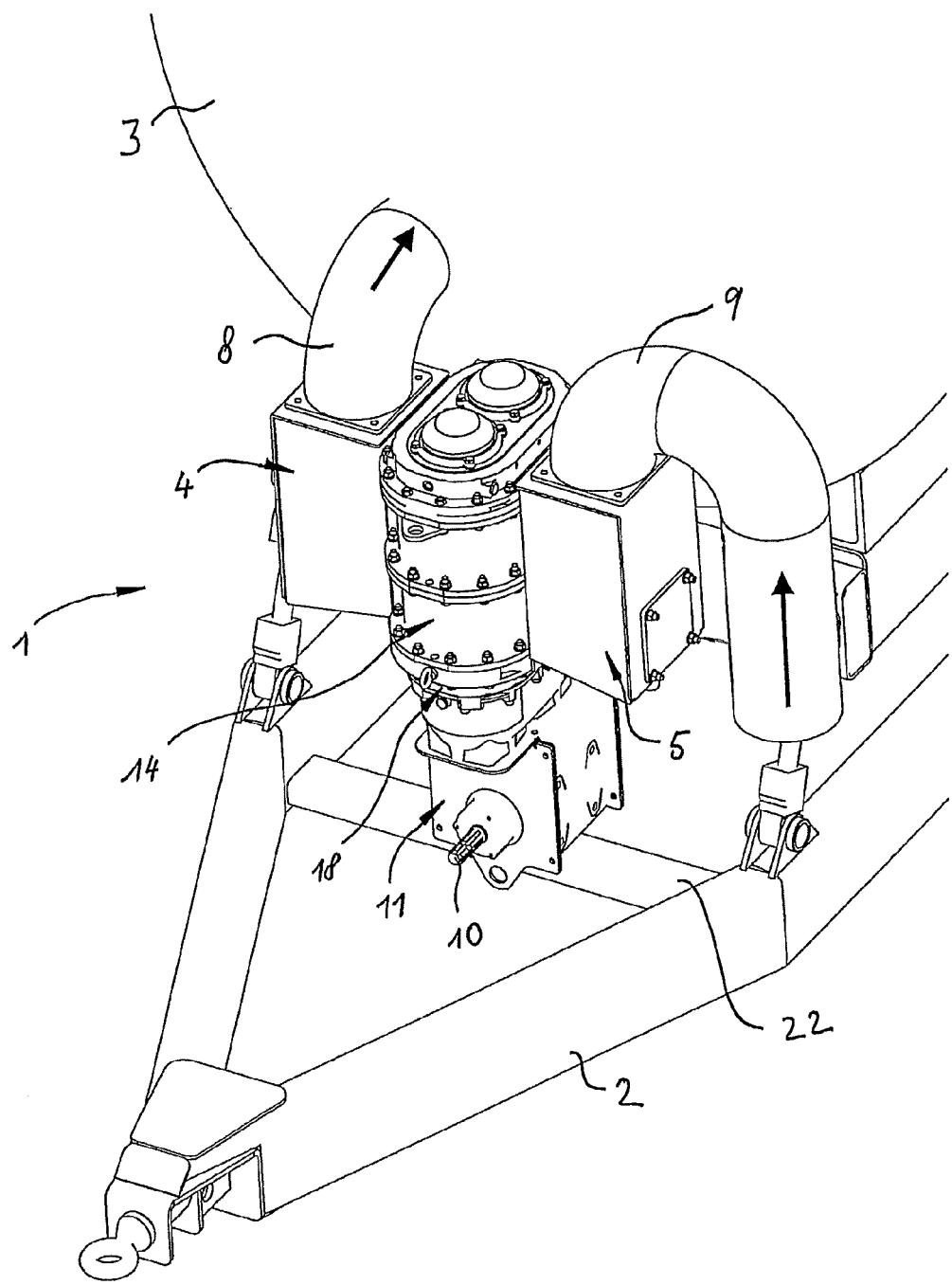
FIG. 1 shows a rotary lobe pump according to the invention and ready for operation, with the angular gear disposed below the pump housing.

Rotary lobe pump 1 according to the invention, shown in FIG. 1, has an angular gear 11 disposed on underside cover 18. Two cuboidal fluid storage volumes 4, 5 are also provided on pump housing 14. A first pipeline 8 connectable to the tank 3 and a second pipeline 9 are connected to pump housing 14 via fluid storage volumes 4, 5. A force or torque for transfer onto the rotary lobes (not shown) can be introduced via drive flange 10 on angular gear 11. The fluid conveying direction when tank 3 is being filled is indicated by arrows on pipelines 8, 9. Angular gear 11 is mounted at approximately the height of drawbar 2 and is somewhat protected by the latter or by a mechanical shield, for example in the form of a crossbar 22, from the ground, for example from a stony or uneven field.

Figure 2:
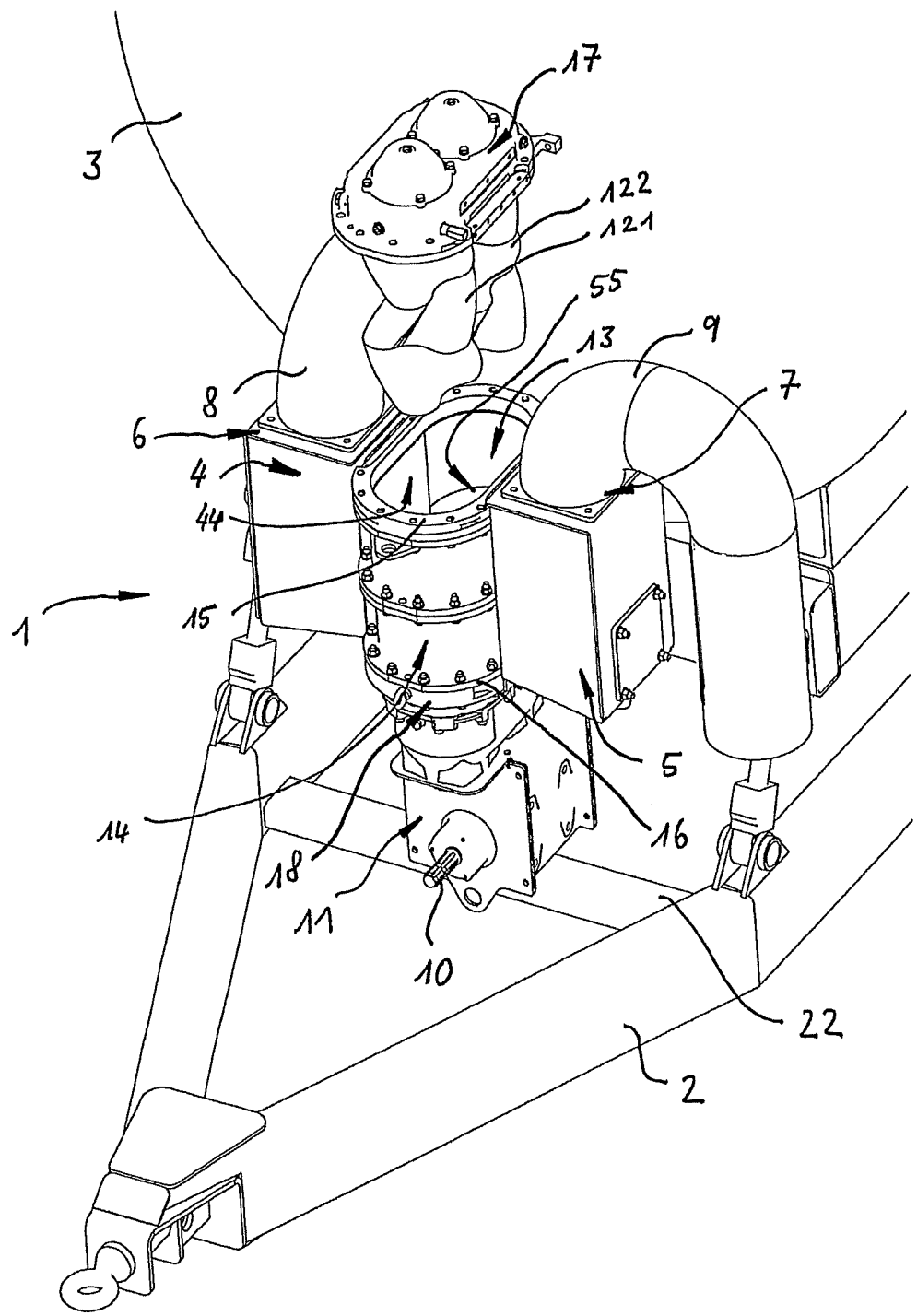
FIG. 2 shows the inventive rotary lobe pump in FIG. 1, with its topside cover dismantled and with dismantled rotary lobes, the angular gear being disposed under the pump housing.

FIG. 2 shows the rotary lobe pump 1 in FIG. 1, specifically with dismantled rotary lobes 121, 122. Rotary lobes 121, 122 are shown after they have been vertically removed from pump housing 14, where rotary lobes 121, 122 may remain coupled to topside cover 17. Pump housing 14 is opened on its upper side only. The fluid (not shown) remains substantially in pump chamber 13.

Figure 3:
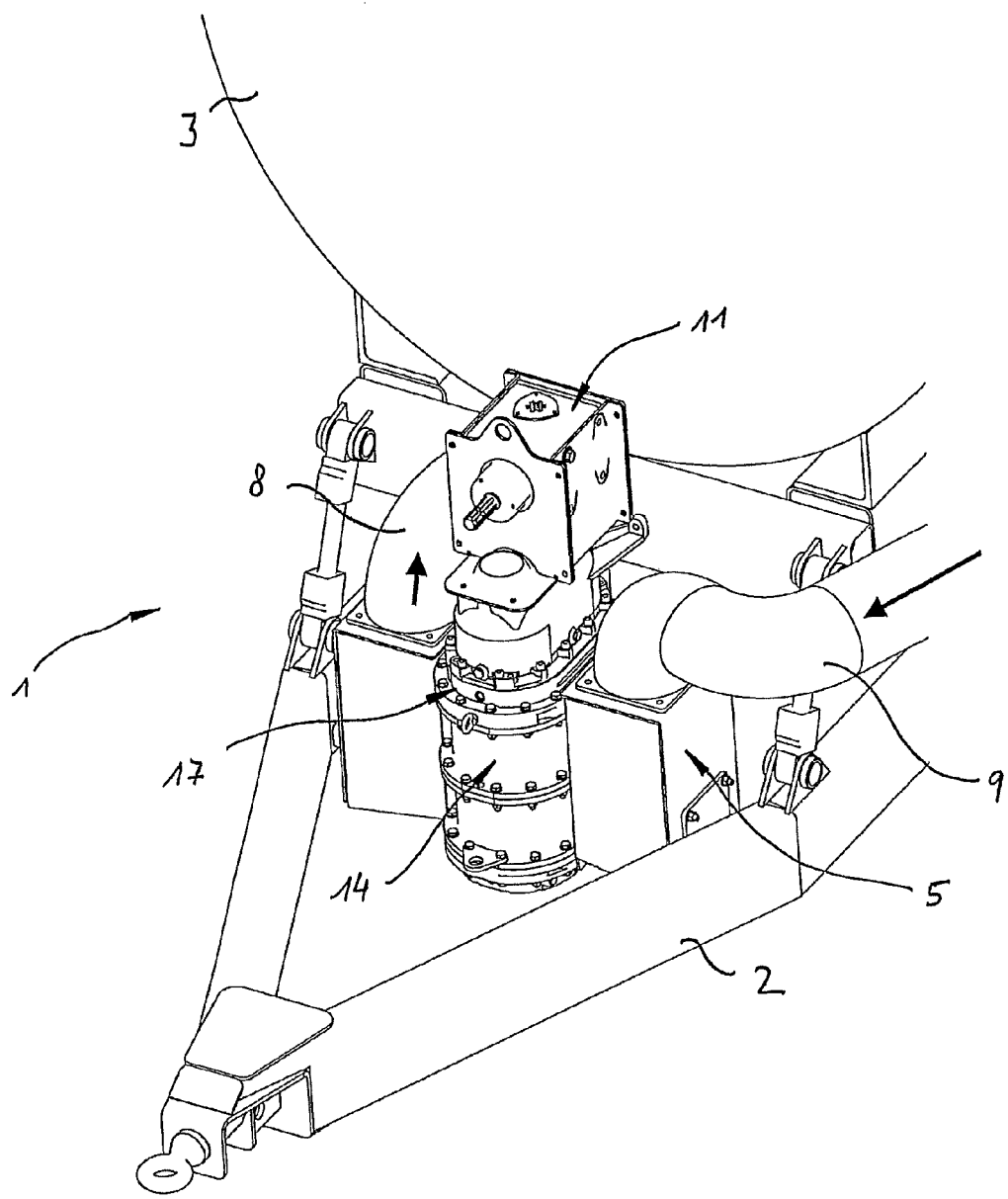
FIG. 3 shows a rotary lobe pump according to the invention and ready for operation, with the angular gear disposed above the pump housing.

The rotary lobe pump 1 according to the invention, as shown in FIG. 3, has an angular gear 11 disposed on topside cover 17, where pump housing 14 can be mounted at approximately the same height as drawbar 2, i.e. about the height of the angular gear lower than in the embodiment shown in FIGS. 1 and 2. The pump housing is protected here by a mechanical shield, for example in the form of a crossbar (not shown), for example from a stony or uneven field. Due to the lower position, the first pipeline 8 connectable to tank 3 can easily be connected to the lowest point of tank 3, which means that tank 3 can easily be drained substantially completely. In addition, if there is a reduction in the pressure differential or suction lift that must be overcome on self-priming, the self-priming function requires less time. If self-priming takes less time, the maintenance intervals can also be extended due to shorter dry-cycle times. Due to the fact that the second pipeline 9 can be laid substantially horizontally to fluid storage volume 5, the risk of fluid leaving fluid storage volume 5 via the second pipeline 9 is also reduced.

Figure 4:
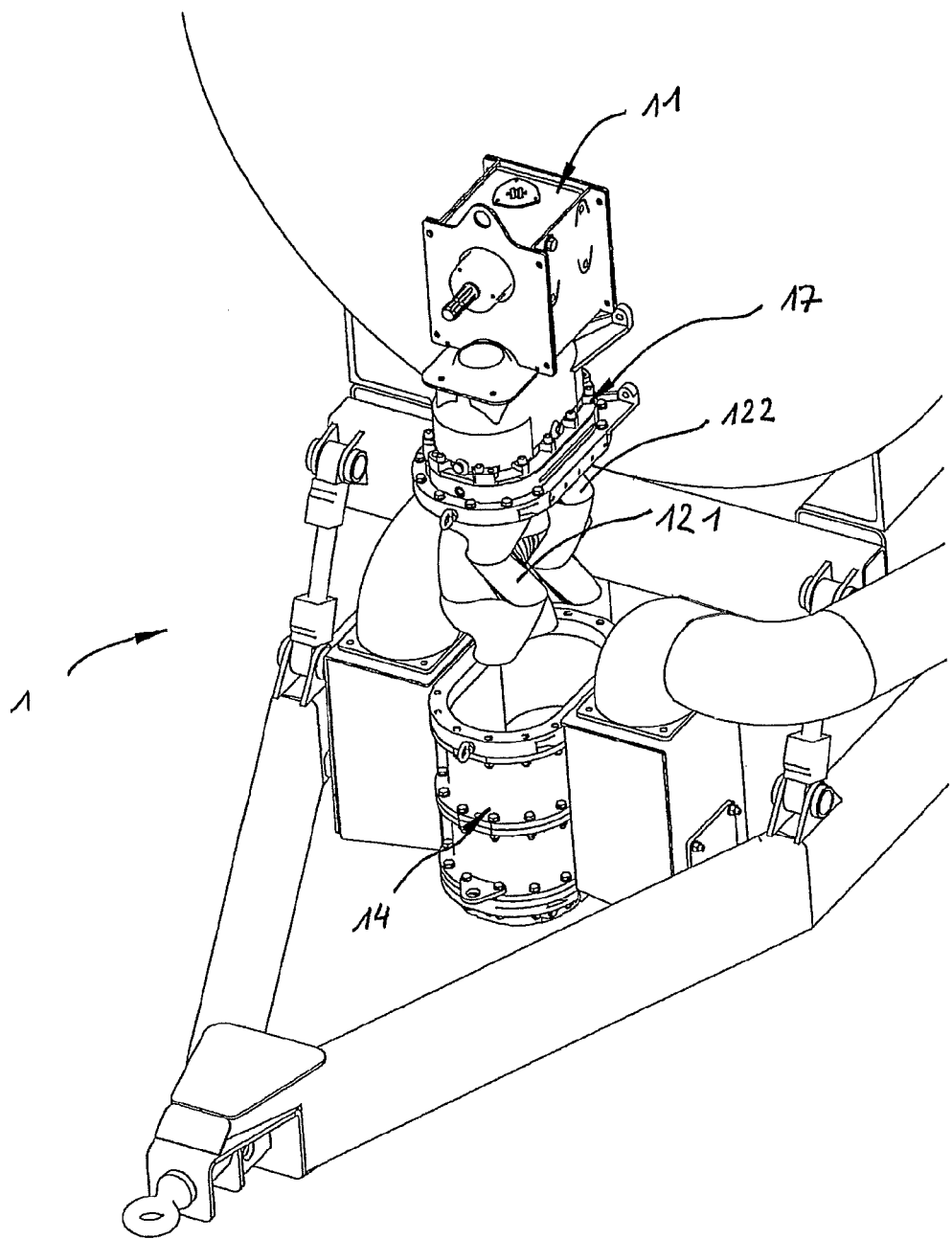
FIG. 4 shows a rotary lobe pump according to the invention with a dismantled topside cover, dismantled rotary lobes and a dismantled angular gear, the angular gear being provided for arrangement above the pump housing.

FIG. 4 shows the rotary lobe pump 1 of FIG. 3 with dismantled angular gear 11, dismantled topside cover 17 and dismantled rotary lobes 121, 122. When angular gear 11 is in this position, all rotating pump parts that are therefore exposed to increased wear and tear can together be removed vertically upwards as a single pump element from pump housing 14. Hoisting gear, for example a hydraulically operated lever or a fork-lift truck, can be used for removal. In order to remove all three pump parts for maintenance work, all that is required is to release topside cover 17 from pump housing 14. This saves time, improves accessibility and, last but not least, allows simpler handling and clean working, to a large extent. Fluids do not escape unimpeded from the pump housing, nor is there any risk that pump components or even just screws, for example, can fall into escaped fluid or become mixed with escaped or escaping fluid.

Because angular gear 11, topside cover 17 and rotary lobes 121, 122 can be removed vertically upwards, the flange connection between topside cover 17 and the pump housing can be designed in such a way that the fixing means for said flange connection, e.g. screws that can be screwed out of a threaded hole, can be removed vertically upwards from above.

Figure 5:
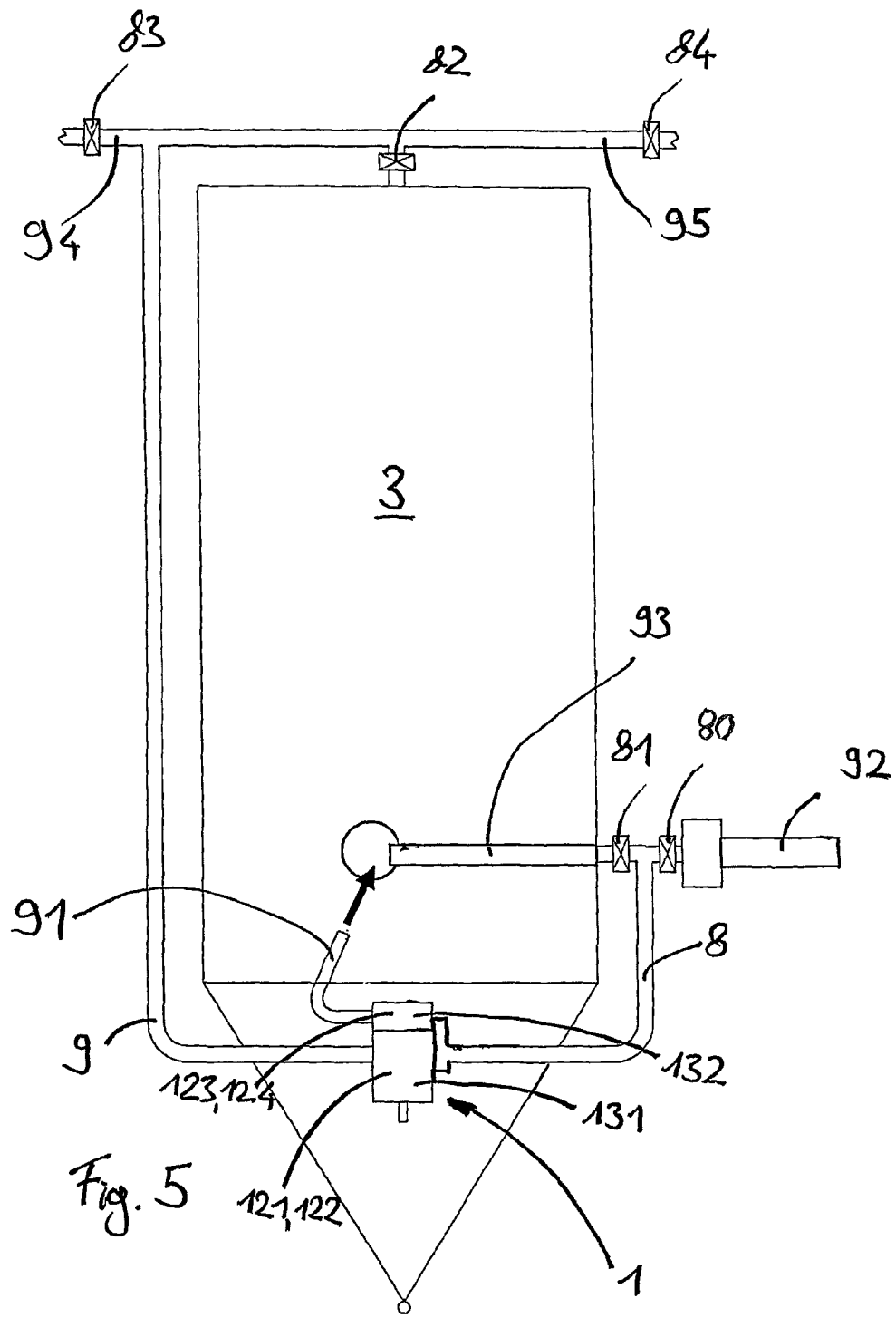
FIG. 5 shows in a plan view onto a tank truck a rotary lobe pump according to the invention, having a first and a second pump chamber instead of one single pump chamber.

The rotary lobe pump 1 according to one embodiment of the invention shown in FIG. 5 is shown schematically such that the rotary lobes are rotatably mounted in the pump housing about a horizontally oriented axis, in the respective pump chamber, when the rotary lobe pump is in the mounted position, although it is also possible to have an arrangement with vertically oriented axes and with the advantages of vertical orientation as described above. FIG. 6 shows a front elevational view of the two-chamber rotary lobe pump of FIG. 5. FIG. 7 shows a cross-sectional view along line A-A in FIG. 6. As shown, the Rotary lobe pump 1 has a first and a second pump chamber 131; 132, with rotary lobes 121, 122; 123, 124 being mounted about horizontally oriented axes when the rotary lobe pump is in its mounted position. Rotary lobes 121, 122; 123, 124 may be mounted about horizontally or vertically oriented axes. Lobes 121 and 121 form an intermeshing pair of lobes of the first pump chamber 131, and lobes 123 and 124 form an intermeshing air of lobes of the second pump chamber 132. FIG. 5 and FIG. 6 show the arrangement with horizontally oriented axes, by way of example. In the mounted position, the first pump chamber 131 is connected to a first pipeline 8, for example via a first connector, and via a second connector to a second pipeline 9. In the mounted position, the second pump chamber 132 is connected to the first pipeline 8 and via a connector to a third pipeline 91. The second pump chamber 132 is designed to convey, via the second pump chamber 132, a part of the fluid volume flow to be conveyed by rotary lobe pump 1. When the third pipeline 91 leads back to tank 3, the fluid can circulate via the second pump chamber 132. In this way, the fluid volume flow rate to be conveyed by rotary lobe pump 1 via the second pipeline 9 can be reduced, and solids-laden fluid can be mixed in tank 3. Mixing or stirring solids-laden fluid is highly beneficial when the aim is to spread an entire tank with homogenous fluid composition at the place of use, for example onto a large field. In the case of solids-laden fluid there is otherwise a risk, depending on the intake position on the tank, that the proportion of solids in the discharged fluid decreases or increases too much.

According to the invention, fluid flows via an intake line 92 into the first pipeline 8 and into the first and second pump chamber 131, 132 when filling tank 3 with valve 80 open and valve 81 closed. The fluid is conveyed from the first pump chamber 131 into tank 3 via the second pipeline 9 when valve 82 is open and discharge valves 83, 84 are closed. A certain proportion of the conveyed fluid volume flow rate is likewise conveyed into tank 3 via the second pump chamber 132 and the third pipeline 91, thus exploiting the full feed rate of rotary lobe pump 1. It is therefore possible to fill the tank sufficiently quickly at a low speed of the power take-off shaft of a towing vehicle.

When discharging the fluid at the place of use, a towing vehicle can also be operated at full engine power without the fluid volume flow rate becoming too high, since the fluid volume flow is fed via a tank intake line 93 to pump chambers 131, 132 when valve 80 is closed and valve 81 is open, and a certain proportion of the fluid volume flow rate is conveyed back into tank 3 via the second pump chamber 132 and the third pipeline 91. Thus, the fluid volume flow rate discharged via discharge lines 94, 95 when valve 82 is closed and discharge valves 83, 84 are open can nevertheless be kept sufficiently low, regardless of whether a reduction gear is provided or not. The fluid, in particular solids-laden fluid, is also well mixed in tank 3 by recirculation via line 91.

When the third pipeline 91 leads back to tank 3, the second pump chamber 132 is then preferably designed in such a way, depending on the layout of the pump, that it can convey a smaller or larger fluid volume flow rate via the second pump chamber 132, relative to the fluid volume flow rate to be conveyed from the first pump chamber 131 of rotary lobe pump 1, and hence to make it circulate.

LIST OF REFERENCE SIGNS

1 Rotary lobe pump
2 Drawbar
22 Crossbar
3 Tank
31 Tanker
4, 5 Fluid storage volumes on the intake and outlet sides
44, 55 Connection openings on the intake and outlet sides
6, 7 Inflow and outflow region
8, 9 First and second pipelines
91 Third pipeline
10 Drive flange
11 Angular gear
121, 122 Rotary lobes
123, 124 Rotary lobes
13 Pump chamber
131; 132 First and second pump chambers
14 Pump housing
15 Topside flange
16 Underside flange
17 Topside cover
18 Underside cover

The invention claimed is:

1. A tank truck comprising a tank and a rotary lobe pump, comprising:
   (a) a drive flange which is connectable to a horizontally extending cardan shaft of a towing vehicle and rotatable in the installed position about a horizontal axis,
   (b) a first pair and second pair of cooperating rotary lobes, the first pair disposed in a first pump chamber, the second pair disposed in a second pump chamber, and the first and second pump chambers are enclosed by a pump housing, wherein each pair is coupled to the drive flange to transfer a torque, and
   (c) the pump housing has inlet and outlet openings for the first and second pump chambers,
   (d) wherein each rotary lobe is rotatably mounted in the pump housing about a vertically oriented rotational axis in the mounted position of the rotary lobe pump to the tank truck,
   (e) wherein the rotational axes of the cooperating rotary lobes extend parallel and are spaced apart from each other,
   (f) the torque from the drive flange is transferred by an angular gear onto the rotary lobes; and
   (g) wherein the first and second pairs of cooperating rotary lobes are mechanically coupled to each other,
   wherein the inlet openings of the first and second pump chambers are in fluid communication with each other and are designed to be connected to a first pipeline, the outlet opening of the first pump chamber designed to be connected to a second pipeline, and the outlet opening of the second pump chamber is connected to a third pipeline,
   further comprising a plurality of switchable valves which are switched from a first valve position where the rotary lobe pump is in fluid communication with the tank of the tank truck such that the tank is filled with fluid by the rotary lobe pump from an intake line to a second valve position, where the plurality of switchable valves are such that the rotary lobe pump is in fluid communication with the tank truck for dispensing the fluid from the tank via a dispensing line and vice versa, wherein
   a) in the first valve position
      said inlet openings of the first and the second pump chambers are in fluid communication with the intake line
      said outlet opening of the first pump chamber is in fluid communication with the tank via said second pipeline, and
      said outlet opening of the second chamber is in fluid communication with the tank via said third pipeline,
   b) in the second valve position
      said inlet openings of the first and the second pump chambers are in fluid communication with a tank intake line
      said outlet opening of the first pump chamber is in fluid communication with the dispensing line via said second pipeline and
      said outlet opening of the second pump chamber is in fluid communication with the tank via said third pipeline.

2. The tank truck according to claim 1, wherein the angular gear comprises a switchable angular reduction gear.

3. The tank truck according to claim 1, wherein the second pump chamber is smaller than the first pump chamber.

4. The tank truck according to claim 1, wherein the rotational axis of one rotary lobe of the first pair of rotary lobes of the first pump chamber is coaxial with the rotational axis of a rotary lobe of the second pair of rotary lobes of the second pump chamber and that the rotational axis of the other rotary lobe of the first pair of rotary lobes of the first pump chamber is coaxial with the rotational axis of the other rotary lobe of the second pair of rotary lobes of the second pump chamber.

* * * * *